United States Patent [19]

Huang et al.

[11] Patent Number: 5,715,271
[45] Date of Patent: Feb. 3, 1998

[54] POLARIZATION INDEPENDENT GRATING RESONATOR FILTER

[75] Inventors: Wei-Ping Huang; Qing Guo, both of Waterloo; Chi Wu, Nepean, all of Canada

[73] Assignee: Northern Telecom Limited, Montreal, Canada

[21] Appl. No.: 691,050

[22] Filed: Aug. 1, 1996

[51] Int. Cl.⁶ ................................................. H01S 3/08
[52] U.S. Cl. ............................. 372/102; 372/20; 372/27; 372/92; 372/98
[58] Field of Search .................................. 372/20, 23, 27, 372/92, 96, 98, 102; 385/37

[56] References Cited

U.S. PATENT DOCUMENTS

| | | | |
|---|---|---|---|
| 4,184,131 | 1/1980 | Haus | 333/195 |
| 4,325,038 | 4/1982 | Coldren | 333/195 |
| 4,796,273 | 1/1989 | Yamaguchi | 372/96 |
| 4,826,282 | 5/1989 | Alferness | 372/102 X |
| 5,212,712 | 5/1993 | Makuta | 372/96 |
| 5,325,392 | 6/1994 | Tohmori et al. | 372/96 |
| 5,392,311 | 2/1995 | Makuta | 372/96 |
| 5,418,802 | 5/1995 | Chwalek | 372/20 |
| 5,497,393 | 3/1996 | Lee | 372/96 |
| 5,504,772 | 4/1996 | Deacon et al. | 372/102 |
| 5,581,642 | 12/1996 | Deacon et al. | 385/15 |
| 5,602,864 | 2/1997 | Welch et al. | 372/50 |

FOREIGN PATENT DOCUMENTS

0 647 861 A1  8/1994  European Pat. Off. ............ 385/37 X

OTHER PUBLICATIONS

"Narrowband grating resonator filters in InGaAsP/InP waveguides" R.C. Alferness et al. Appl. Phys. Lett., vol. 49, pp. 125–127, 1986 No Month.

"Fabrication of Narrow–Band Channel–Dropping Filters" M. Levy et al. IEEE Photon. Technol. Lett., vol. 4, No. 12, pp. 1389–1391, 1992 No Month.

"Tunable wavelength filters using λ/4–shifted waveguide grating resonators" T. Numai et al Appl. Phys. Lett. 53(2), 11 Jul. 1988.

"A Coupled–Waveguide Grating Resonator Filter" W–P. Huang et al IEEE Photonics Technol. Letters. vol. 4, No. 8, pp. 884–886, 1992 No Month.

"Narrow–Band Resonant Optical Reflectors and Resonant Optical Transformers for Laser Stabilisation and Wavelength Division Multiplexing" R.F. Kazarinov et al. IEEE J. Quantum Electron. vol. QE–23, No. 9, Sep. 1987.

"Narrow–Band Optical Channel–Dropping Filter" Hermann A. Haus, et al J. Lightwave Technol. vol. 10, No. 1, pp. 57–61, 1992 No Month.

"Theory, Design, and Performance of Extended Tuning Range Semiconductor Lasers with Sampled Gratings" V. Jayaraman, et al IEEE J. Quantum Electron. vol. 29, No. 6, pp. 1824–1834, 1993 No Month.

"Super Structure Grating (SSG) for Broadly Tunable DBR Lasers" H. Ishii, et al IEEE Photon. Technol. Lett., vol. 4, No. 4, pp. 393–395, 1993 No Month.

*Primary Examiner*—Brian Healy
*Attorney, Agent, or Firm*—Angela C. de Wilton

[57] ABSTRACT

A polarization independent optical resonator comprising a phase-shifted grating structure is disclosed and analyzed. An application as a polarization independent optical wavelength filter with ultra-narrow bandwidth and fine tunability is described.

7 Claims, 7 Drawing Sheets

POLARIZATION INDEPENDENT GRATING RESONATOR FILTER

FIELD OF THE INVENTION

This invention relates to a phase shifted grating structure for a polarization independent optical resonator, and more particularly to a phase-shifted grating structure for application as a polarization independent optical wavelength filter.

BACKGROUND OF THE INVENTION

Narrow band, tunable optical wavelength filters are key components in optical communications systems for channel selection and noise filtering for wavelength division multiplexing (WDM) transmission systems. Optical filters with extremely narrow band width have been demonstrated based on grating resonators, as discussed in the following reference, for example, R. C. Alferness et al, "Narrow band grating resonator filters in InGaAsP/InP waveguides", Appl. Phys. Lett., vol. 49, pp. 125–127, 1986. Typically a waveguide grating resonator filter comprises a waveguide with two corrugated reflector sections, i.e. grating structures, which are effectively $\pi/2$ ($\lambda/4$) shifted relative to each other. The phase shift could in theory be provided by a slip in the grating period, but for gratings of practical dimensions, the phase shift is achieved by a section in which the corrugations are removed. Optical resonator filters have an analog in the surface acoustic wave filter, see for example U.S. Pat. No. 4,325,038 to Coldren and U.S. Pat. No. 4,184,131 to Haus.

In grating resonator filters, the incoming signals whose frequencies lie close to the Bragg frequency are transmitted, whereas those falling within the stop band of the grating structure are reflected. Transmission resonator filters or Bragg reflecting gratings are attractive because of their narrow bandwidth, tunability and compactness.

For example, waveguide couplers combined with $\lambda/4$ shifted distributed feedback resonators to produce narrow band channel dropping filters have been described by H. A. Haus and Y. Lai, in "Narrow band optical channel dropping filter" J. Lightwave Technol. Vol. 10, no. 1, pp. 57–61, 1992. M. Levy et al., in "Fabrication of narrow band channel-dropping filters" IEEE Photon. Technol. Lett., Vol. 4, no. 12, pp. 1389–1391, 1992 describes fabrication of devices as proposed by Haus above, which are capable of selecting channels significantly narrower than 1 Å bandwidth. Tu Numai et al., in "Tunable wavelength filter using $\lambda/4$ shifted waveguide grating resonators" describes tuning of the transmission resonance wavelength of grating resonators by carrier injection, and implementation of two channel switching.

W-P. Huang et al. in "A coupled waveguide grating resonator filter, IEEE Photonics Technol. Letters, Vol. 4, no. 8, pp. 884–886, 1992 provides an analysis of a narrowband tunable wavelength filter, which differs from that of Haus, mentioned above, in that coupling between the waveguides was assumed to be strong, and the Bragg signal is totally transmitted at resonance. The filter comprises a grating structure with a phase shift region of length $L_p$ inserted between two reflecting grating regions of lengths $L_1$ and $L_2$. This filter is highly polarization sensitive.

Conventional known grating resonators are polarization sensitive due to the modal birefringence, as well as the polarization dependent grating couplings and modal losses/gains. When filters are sensitive to the polarization of the input signal, the variation in the amplitude of the dropped channel will fluctuate with the polarization of the input signal. Nevertheless, these latter devices work in transmission rather than reflection, and may be fabricated with a shorter length than comparable uniform reflection grating filters.

Other filter structures are discussed for example, in an article entitled "Narrow band Resonant Optical Reflector and Resonant Optical Transformers for Laser Stabilization and Wavelength Division Multiplexing", IEEE J. Quantum Electron. vol. QE-23, no. 9, September 1987, Kazarinov et al. analyses a Bragg resonator to show that the resonator mode in a Bragg reflector stop band is determined by the gap between the two Bragg reflectors. Distributed reflectors for wavelength tuning of a distributed feedback (DFB) laser are described in U.S. Pat. No. 5,325,392 to Tohmori et al.

For applications requiring a polarization insensitive filter, a polarization independent optical wavelength selective coupler is described by Alferness et al., in European Patent Application No. 0 647 861 A1. In this structure, a double periodic grating, i.e. equivalent to a combination of two gratings with slightly different periods, are chosen to match the difference in propagation constants of the TE and TM polarization modes, so that both modes are coupled at the same wavelength. This is achieved by a double periodic grating which comprises a 180° transition between intervals of uniform grating.

A polarization independent Bragg reflector based on a phase shifted grating structure was proposed and analyzed in a paper entitled "A Polarization independent distributed Bragg reflector on phase shifted grating structures" to be published by the present inventors in IEEE J. Lightwave Technology. However, the band width of the latter filters is too wide for many applications, and a resonator filter is required to provide a bandwidth which is a fraction of the stopband width.

Consequently known designs for resonator filters do not provide both narrow bandwidth and polarization insensitivity.

SUMMARY OF THE INVENTION

Thus the present invention seeks to produce a grating structure for an optical resonator filter with narrow bandwidth, which is polarization insensitive.

According to one aspect of the present invention there is provided a phase shifted grating structure for a grating resonator filter which is polarization insensitive. The resonator comprises first and second sections of phase shifted gratings, each of which is made of a grating section of length $L_g$ with grating period $\Lambda_g$ and a phase shift section of length $L_s$, and a phase shift section of length $L_p$ is disposed between the first and second sections of phase shifted gratings.

The dimensions of the grating structure, including grating lengths $L_p$, $L_g$, $L_s$ and grating period $\Lambda_g$ are determined so that the response of the filter is polarization insensitive and provides narrow bandwidth. That is the grating structure is designed to match the propagation constant for both the TE and TM modes at a specific wavelength $\lambda_0$ at the centre of the stopband.

In particular, the dimensions of the grating structure are defined by the following equations:

$$\frac{2\pi}{\lambda_0} N_{TE} L_P + \Phi_{TE} = (2n_{TE} + 1)\frac{\pi}{2} \quad (11a)$$

$$\frac{2\pi}{\lambda_0} N_{TM} L_P + \Phi_{TM} = (2n_{TM} + 1)\frac{\pi}{2} \quad (11b)$$

where $$\Phi_{TE} = \tan^{-1}\left\{ \frac{\delta_{TE}}{\left(\sqrt{|\kappa_{TE}(m)|^2 - \delta_{TE}^2(m)}\right)} \tanh\left(\sqrt{|\kappa_{TE}(m)|^2 - \delta_{TE}^2(m)}\; L_2\right) \right\} \quad (12a)$$

$$\Phi_{TM} = \tan^{-1}\left\{ \frac{\delta_{TM}}{\left(\sqrt{|\kappa_{TM}(m)|^2 - \delta_{TM}^2(m)}\right)} \tanh\left(\sqrt{|\kappa_{TM}(m)|^2 - \delta_{TM}^2(m)}\; L_2\right) \right\} \quad (12b)$$

and where $n_{TE}$ and $n_{TM}$ are integers.

By making certain approximations, analytical solutions for determining the grating structure, i.e. lengths and grating periods, required for a narrow bandwidth, polarization insensitive grating resonator filter are derived.

To find $L_g$, $L_s$, and $L_p$, the following parameters must be known: $\lambda_0$ the wavelength, $N_{TE}$ the effective index of the TE mode and $N_{TM}$ the effective index of the TM mode. When those parameters are given, the cross-section of the device is given. That is the value of B may be calculated from equation (16)

$$B = \frac{N_{TE} - N_{TM}}{N_{TE} + N_{TM}}$$

and then g may be calculated from equation (14), i.e.

$$g = \frac{1 - B}{2B}.$$

Then using the relationship of equation (17), $\kappa_{TE}(g+1) = \kappa_{TM}(g)$, so that $$\Lambda_s = \frac{1 + B}{1 + (2s - 1)} \frac{\lambda_0}{2N_{TE}}$$

can be calculated (equation (15)), the parameter s can be obtained.

Given s, and g and $\Lambda_g$, then $L_s = s\Lambda_g$, $L_g = g\Lambda_g$ and $L_z = n_z(L_g + L_s)$, where $n_z$ is an integer number and can be chosen by the designer.

Using the approximation, $$n_{TM} = \frac{1 - B}{2B} + \Delta n_{TM} \quad (24)$$

where $$\Delta n_{TM} = \frac{4N_{TE}}{\lambda_0} \frac{\tanh(\kappa_{TM} L_z)}{\kappa_{TM}} B\Delta g - 0.5 \quad (25)$$

For an optimum design, $\Delta g$ is varied to make the right hand side of the equation (25) close to an integer. $\Delta g$ and $\Delta\Lambda_g$ can be chosen, for example, from FIG. 5. $\Phi_{TE}$ can then be determined by Equation (22b). The length of the phase shift section between the reflectors is given by $$L_p = \left[ (2n_{TM} + 3)\frac{\pi}{2} - \Phi_{TE} \right] \frac{\lambda_0}{2\pi N_{TE}} \quad (26)$$

An increase in $\Delta\Lambda_g$ will induce an increase in $\Phi_{TE}$ and a decrease in $L_p$ if $n_{TM}$ is a given constant. Hence equation (25) may be independent of $\Delta\Lambda_g$ and total device length is $$L = 2L_z + L_p \quad (27)$$

where, $L_z = n_z(L_g + L_s)$ and $n_z$ represents the number of gratings in each grating section.

By an optimization procedure, solutions to these equations are found. Since the shifts of the stopbands from $\lambda_0$ for the quasi TE and TM modes is directly proportional to $|\Delta g|$ preferably the smaller values of $\Delta gm$ which allow for maximum tunable range, are selected.

In particular, two examples of gratings for polarization independent ultra-narrow band filters based on the proposed phase-shifted grating resonator are given by the following parameters, with common parameters chosen as $N_{TE}=3.25$, $\kappa_{TE}^\circ=100$ cm$^{-1}$, $\lambda_0=1.55$ μm. According to the design principles set out herein, in Example A, for a normalized birefringence B=2.0×10$^{-3}$, the dimensions were: g=245, $\Lambda_g=0.2389$ μm, $L_s=0.1197$ μm, $L_g=58.5395$ μm, $L_p=62.60231$ μm, $\Delta g=4.5$, $n_{TM}=261$, m=8, and L=1.011 mm and for example B with normalized birefringence B=4.0×10$^{-3}$ g=121, $\Lambda_g=0.2394$ μm, $L_g=28.9696$ μm, $L_s=0.1202$ μm, $L_p=34.4711$ μm, $\Delta g=3.5$, $n_{TM}=143$, m=16, and L=0.9653 mm. Analysis of resonator filters fabricated with these dimensions shows that the spectral response is characterized by narrow bandwidth and polarization insensitivity. Since $\Delta g>0$, the stop band of the TE mode shifts towards shorter wavelength while that of the TM mode shifts to longer wavelength. In both examples indistinguishable stop bands for the two polarizations were realized, centered at the operating wavelength, $\lambda_0=1.55$ μm.

Tunability is another desirable feature for a filter. The available tuning range for the polarization independent resonator filter is limited by the common stop band of the quasi TE and TM modes. For the example described above, the normalized tuning ranges, which are defined as the ratio of the available tuning range to 3 dB bandwidth are about 180 for Example A and 120 for Example B. Increased tunability may be provided by carrier injection to alter the refractive index of the grating structure.

Thus, a resonator filter providing a narrow bandwidth and polarization insensitivity is provided.

BRIEF DESCRIPTION OF THE DRAWINGS

FIG. 4 shows the relative central wavelength shift $$|\delta\lambda_0/\lambda_0|$$

as a function of normalized modal birefringence B for the phase shifted grating reflector;

FIGS. 5a and 5b show resonant wavelength shifts for the phase shifted grating resonators: FIG. 5a shows the relative shifts as a function of $\Delta g$; and FIG. 5b shows the relative shifts as a function of $\Delta \Lambda_g$.

FIGS. 7a and 7b show the spectral responses for the two examples of phase shifted grating resonators according to the embodiment: FIG. 7a for g=245, $\Delta g$=4.5 and $\Delta n_{TM}$=143; FIG. 7b for g=121, $\Delta g$=3.5 and $\Delta n_{TM}$=143;

FIG. 8 shows the spectral responses near the resonant wavelength with effective index changes: FIG. 8a for the grating with parameters as shown in FIG. 7a and FIG. 8b for the grating with parameters as shown in FIG. 7b.

DESCRIPTION OF THE EMBODIMENTS

Figure 1:
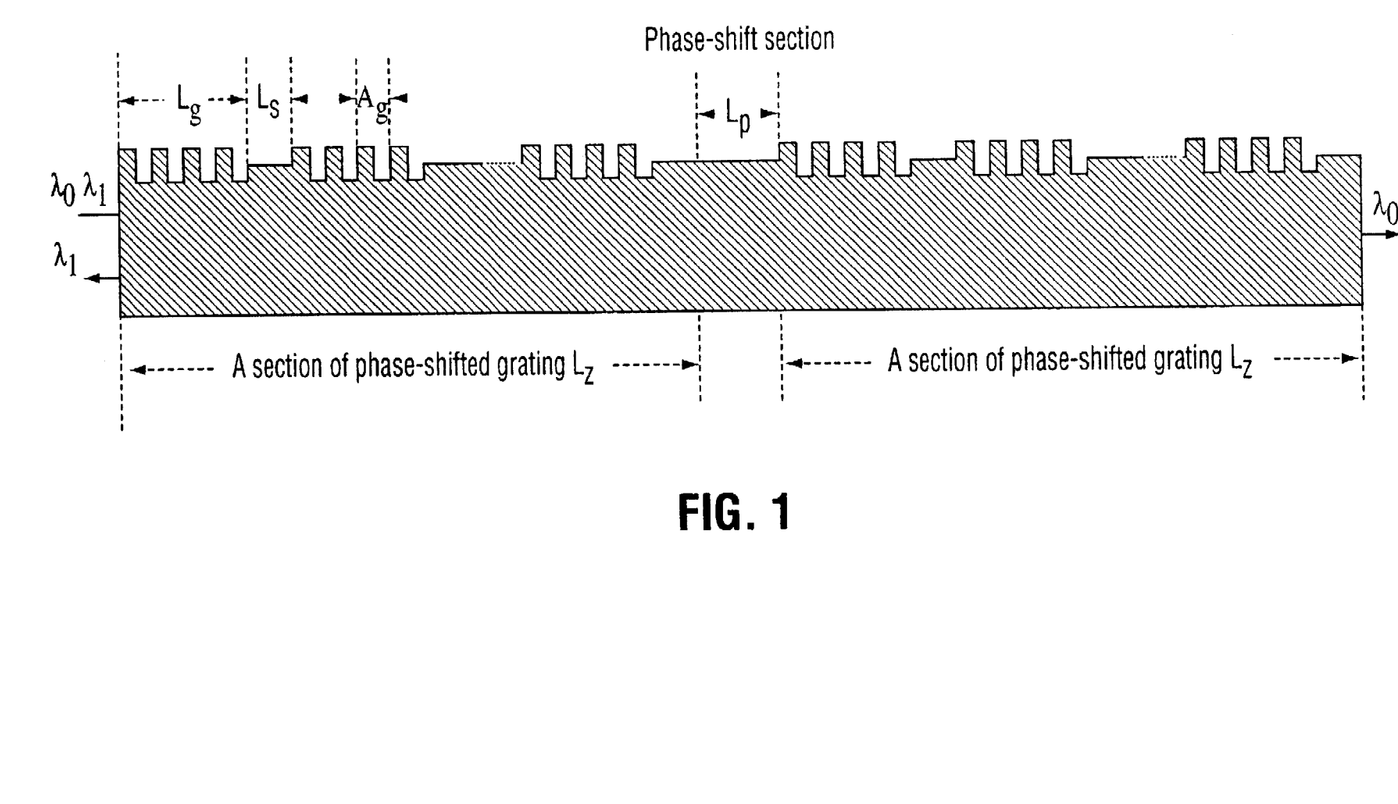
FIG. 1 shows a cross-sectional diagram through a phase shifted grating resonator according to a first embodiment of the present invention.

A grating structure for a resonator filter according to a first embodiment of the present invention is shown schematically in FIG. 1 and comprises a phase shifted grating structure which is polarization insensitive. The resonator comprises first and second sections of phase shifted gratings, each of which comprises a plurality of grating sections of length $L_g$ with grating period $\Lambda_g$ and intervening phase shift sections of length $L_s$. Another phase shift section of length $L_p$ is disposed between the first and second sections of phase shifted gratings.

The dimensions of the grating structure, including grating lengths $L_p$, $L_g$, $L_s$ and grating period $\Lambda_g$ are determined so that the response of the filter is polarization insensitive and provides narrow bandwidth. That is the grating structure is designed to match the propagation constants for both the TE and TM modes at the same wavelength $\lambda_0$ at the centre of the stop band.

The dimensions of the grating structure were defined using the design principles set out below. Using the derived equations, the physical dimensions for two examples of the grating structure of the embodiment were determined as set out in the following sections.

As a result, two polarization independent ultra-narrow band filters based on the phase shifted grating resonator of the embodiment were designed using common parameters as follows: refractive index for the TE mode $N_{TE}$=3.25, coupling coefficient $\kappa_{TE}^0$=100 cm$^{-1}$, and a central wavelength of $\lambda_0$=1.55 µm.

Thus, according to the design principle, in Example A, for a normalized birefringence B=2.0×10$^{-3}$, the grating dimensions were: g=245, $\Lambda_g$=0.2389 µm, $L_g$=0.1197 µm, $L_s$=58.5395 µm, $L_p$=62.60231 µm, $\Delta g$=4.5, $n_{TM}$=261, m=8, and L=1.011 mm.

Figure 7A:
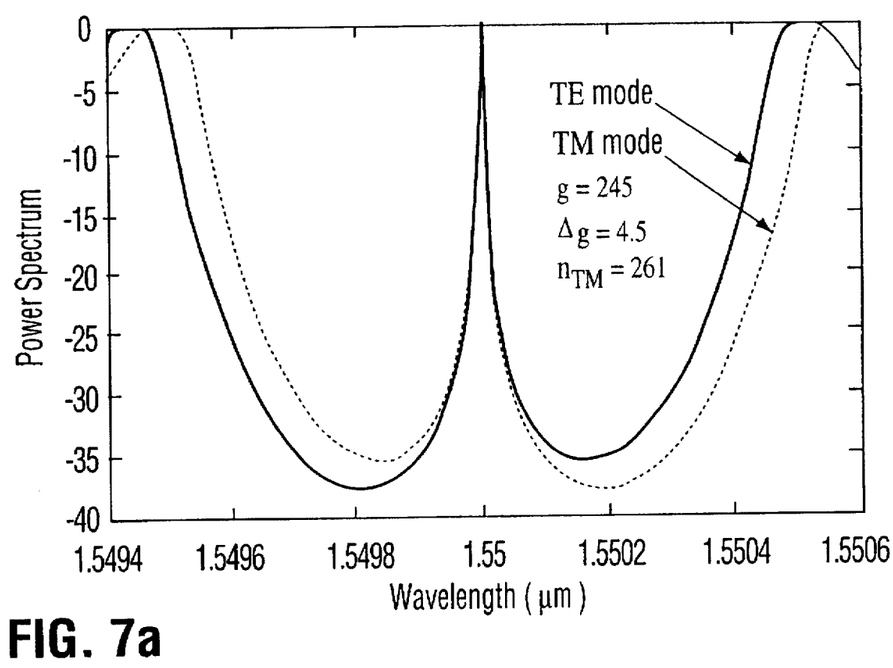
Figure 7B:
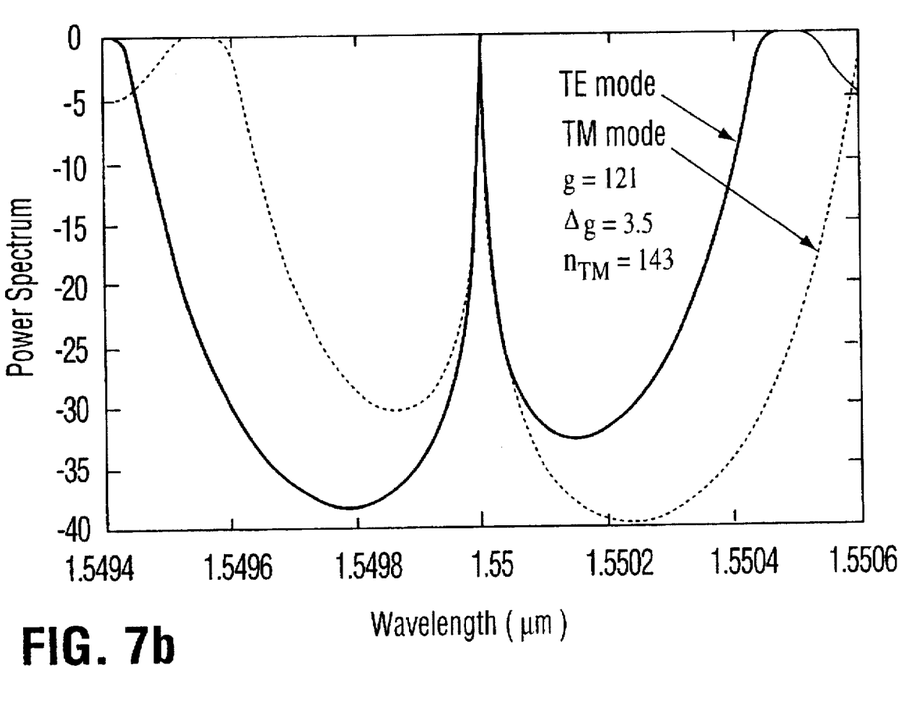

For Example B the grating dimensions were: g=121, $\Lambda_g$=0.2394 µm, $L_g$=28.9696 µm, $L_s$=0.1202 µm, $L_p$=34.4711 µm, $\Delta g$=3.5, $n_{TM}$=143, m=16, and L=0.9653 mm For the sake of brevity, a lossless case was considered, i.e. $\kappa_{TM}^0 = \kappa_{TE}^0$. FIG. 7 illustrates the spectral response in terms of transmitted power for the quasi TE and TM modes for examples A and B. Since $\Delta g$>0, the stop band of the TE mode is shifted towards shorter wavelength while that of the TM mode is shifted to longer wavelength as shown in FIG. 7. It is observed that in both cases indistinguishable stop band for the two polarizations are realized, centered at the operating wavelength.

Figure 8A:
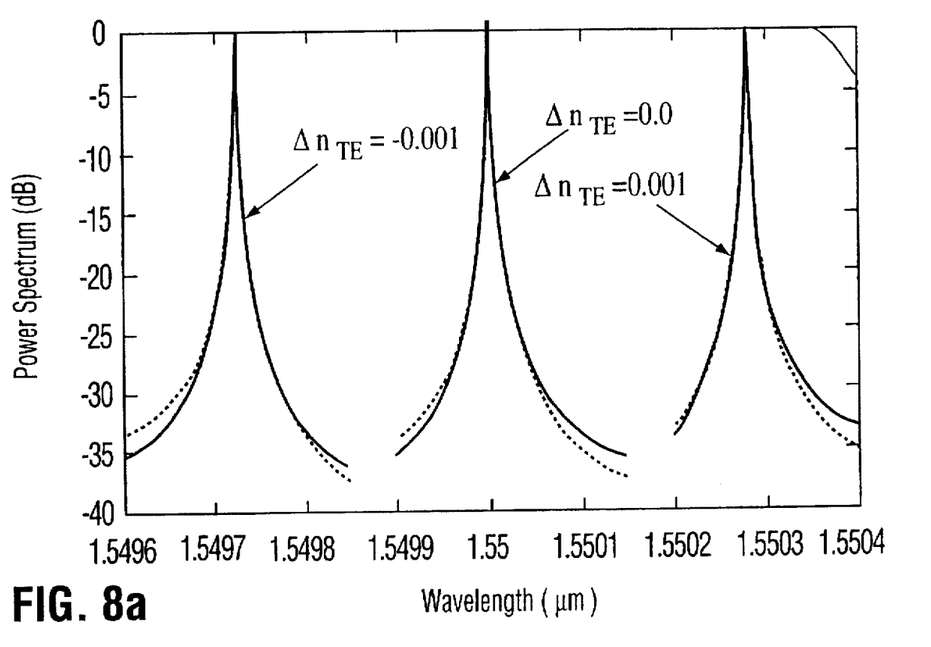
Figure 8B:
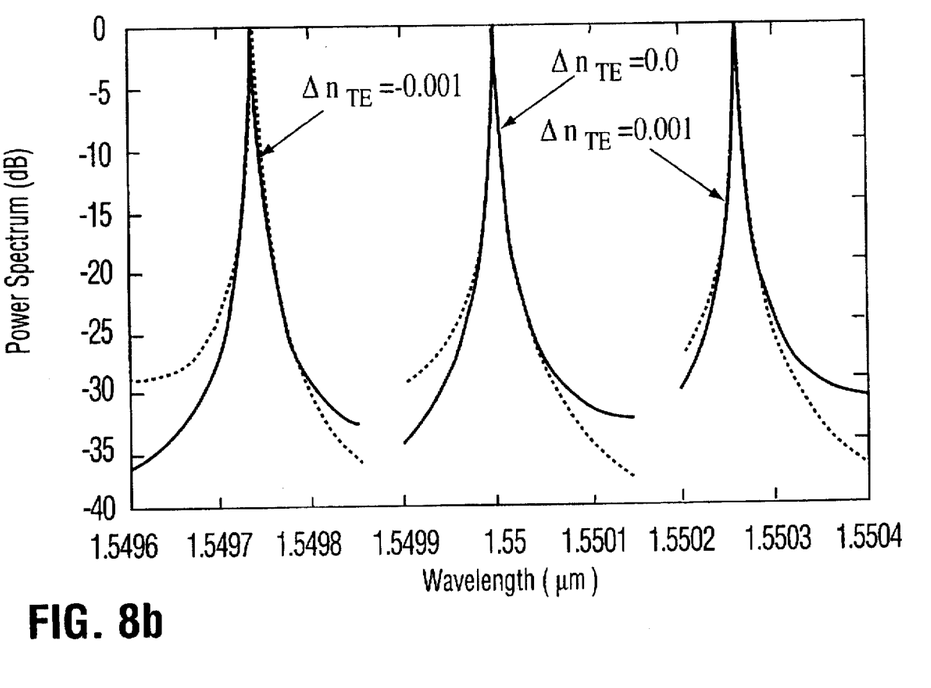

Tunability is a desirable feature for the filter. The available tuning range for the polarization independent resonator filter is limited by the common stop band of the quasi TE and TM modes. For the example described above, the normalized tuning ranges, which are defined as the ratio of the available tuning range to 3 dB bandwidth are about 180 for Example A and 120 for Example B. FIGS. 8a and 8b show the spectral response near the resonant wavelength with effective index changes, which may be realized with carrier injection. That is, when carriers are injected into the filter the effective refractive index decreases, because of the plasma effect, therefore the transmission resonance wavelength shifts to shorter wavelength.

Design Principles:

Principles for design of sampled gratings and super structure gratings to extend the tuning range in laser design are discussed by V. Jayaraman, et al in "Theory, design, and performance of extended tuning range semiconductor lasers with sampled gratings", IEEE J. Quantum Electron. vol. 29, no. 6. pp. 1824–1834, 1993 and by H. Ishii, et al. in "Super structure grating (SSG) for broadly tunable DBR lasers" in IEEE Photon. Technol. Lett., vol. 4, no. 4, pp. 393–395, 1993.

In this work, the design principles are extended to achieve polarization independence of a grating resonator filter design, rather than extended tuning range.

The purpose of the design is to find $L_g$, $L_s$, and $L_p$, as shown in FIG. 1.

Theoretical Formulations

The coupled mode equations governing the amplitudes of the forward and backward modes in a grating are:

$$\frac{dF_n}{dz} = -j\delta_n(m)F_n - j\kappa_n(+m)B_n \tag{1a}$$

$$\frac{dB_n}{dz} = j\delta_n(m)B_n + j\kappa_n(-m)F_n \tag{1b}$$

where n stands for the quasi TE and TM modes and m is the order of the spatial harmonic. The detuning factors are defined by $$\delta_n(m) = \frac{2\pi}{\lambda} N_n - \frac{m\pi}{(g+s)\Lambda_g} \tag{2}$$

where $N_n$ is the effective index of the quasi TE or TM mode. $\lambda$ is the operation wavelength. The coupling coefficient is given by $$\kappa_n(m) = (-1)^m \frac{1}{2m} \tan\left[\frac{m\pi}{2(g+s)}\right] \sin\left[\frac{m\pi}{(g+s)}\right] \kappa_n^0 \tag{3}$$

where $\kappa_n^0$ is the coupling coefficient due to the grating in the absence of the phase shift regions (i.e. s=0 and m=1). Under semi-vectorial approximation where only transverse electric fields are considered, $\kappa_n^0$ can be expressed as $$\kappa_{TE}^0 = j\frac{\omega\epsilon_0}{2\pi} \int \Delta n^2(x,y) E_{TE} \cdot E_{TE}^* da \tag{4a}$$

$$\kappa_{TM}^0 = j\frac{\omega\epsilon_0}{2\pi} \int \Delta n^2(x,y) \frac{\bar{n}^2}{n^2} E_{TM} \cdot E_{TM}^* da \tag{4b}$$

where n and $\bar{n}$ are the refractive indices with and without gratings, whereas $\Delta n$ is the grating perturbation.

In deriving equations (1) to (4), the reference waveguide was chosen so that the self-coupling coefficients vanish.

Such a choice will yield a simple, yet accurate formulation, which demonstrates the principles of the device.

For the sake of simplicity, it is assumed that the grating shape is rectangular, although other types of grating may be analyzed in a similar fashion. $\Lambda_g$ is the period of the fine gratings, and $L_g = g\Lambda_g$, $L_s = s\Lambda_g$ are the lengths of the grating and the phase shift sections respectively, g and s being the number of periods of each grating Analytical expressions for the amplitudes of the transmitted and reflected guided modes in the phase shifted grating structures are expressed by $$F_n(z) = M_n(z)F_n(0) + N_n(z)B_n(0) \quad (5a)$$
$$B_n(z) = N_n(z)F_n(0) + M_n^*(z)B_n(0) \quad (5a)$$

where $$M_n = \cosh(Q_n z) - j\frac{\delta_n}{Q_n}\sinh(Q_n z) \quad (6a)$$

$$N_n = \frac{|\kappa_n(m)|}{Q_n}\sinh(Q_n z) \quad (6b)$$

and $$Q_n = \sqrt{|\kappa_n(m)|^2 - \delta_n^2(m)} \quad (7)$$

Assuming that the two phase shifted grating sections are of equal length $L_z$, the amplitudes of the forward and the backward waves may be expressed by $$A_n(2L_z + L_p) = \bar{M}_n F_n(0) + \bar{N}_n B_n(0) \quad (8a)$$

$$B_n(2L_z + L_p) = \bar{N}_n F_n(0) + \bar{M}_n^* B_n(0) \quad (8b)$$

where $$\bar{M}_n = M_n^2 \exp\left(-j\frac{2\pi}{\lambda} N_n L_p\right) + N_n^2 \exp\left(j\frac{2\pi}{\lambda} N_n L_p\right) \quad (9a)$$

$$\bar{N}_n = 2N_n R\left\{M_n \exp\left(-j\frac{2\pi}{\lambda} N_n L_p\right)\right\} \quad (9b)$$

The resonant condition for the grating resonator can be derived from equations (8) and (9).

$$R\left\{M_n \exp\left(-j\frac{2\pi}{\lambda} N_n L_p\right)\right\} = 0 \quad (10)$$

More explicitly, this condition may be expressed as $$\frac{2\pi}{\lambda_0} N_{TE} L_P + \Phi_{TE} = (2n_{TE} + 1)\frac{\pi}{2} \quad (11a)$$

$$\frac{2\pi}{\lambda_0} N_{TM} L_P + \Phi_{TM} = (2n_{TM} + 1)\frac{\pi}{2} \quad (11b)$$

where $$\Phi_{TE} = \tan^{-1}\left\{\frac{\delta_{TE}}{\left(\sqrt{|\kappa_{TE}(m)|^2 - \delta_{TE}^2(m)}\right)}\tanh\left(\sqrt{|\kappa_{TE}(m)|^2 - \delta_{TE}^2(m)}\, L_2\right)\right\} \quad (12a)$$

$$\Phi_{TM} = \tan^{-1}\left\{\frac{\delta_{TM}}{\left(\sqrt{|\kappa_{TM}(m)|^2 - \delta_{TM}^2(m)}\right)}\tanh\left(\sqrt{|\kappa_{TM}(m)|^2 - \delta_{TM}^2(m)}\, L_2\right)\right\} \quad (12b)$$

$n_{TE}$ and $n_{TM}$ are integers. To realize a polarization independent grating resonator, the resonant conditions of equations (11a) and (11b) must be satisfied simultaneously.

Figure 2:
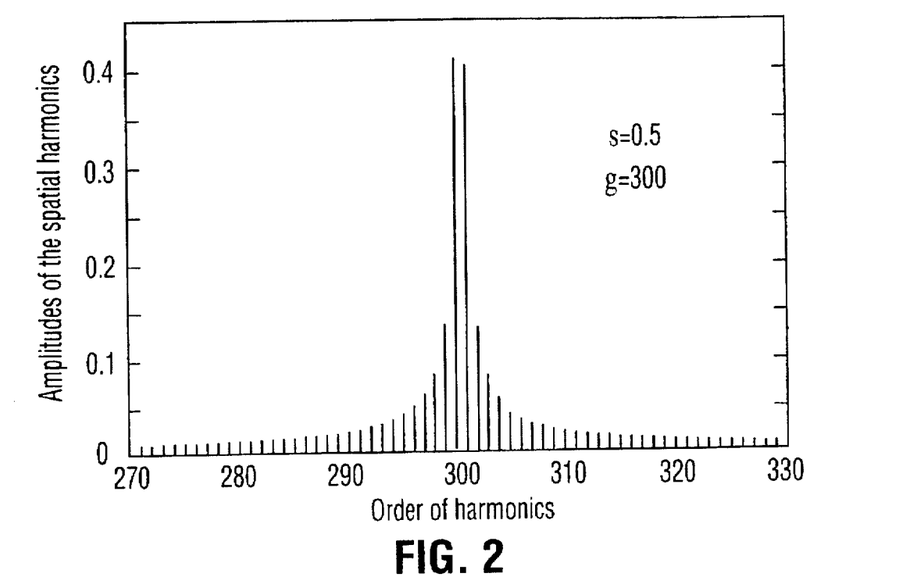
FIG. 2 shows the relative amplitudes of the different spatial harmonics for the grating resonator of FIG. 1.

Thus, for a phase shifted grating structure according to the first embodiment, as shown in FIG. 1, the periodically inserted phase shift section $L_S$ modulates the original periodic gratings and therefore generates a spectrum with multiple peaks. Each peak corresponds to a spatial harmonic in the Fourier series of the index perturbation along the waveguide. There are two dominant spatial harmonics, i.e. m=g and g+1, in the Fourier expansion as shown in FIG. 2 for s=0.5 and g=300. The spectral positions of these dominant harmonics may vary depending on the phase matching conditions such as $$\delta_{TE}(g+1) = \frac{2\pi}{\lambda_{TE}} N_{TE} - \frac{(g+1)\pi}{(g+s)\Lambda_g} = 0 \quad (13a)$$

$$\delta_{TM}(g) = \frac{2\pi}{\lambda_{TM}} N_{TM} - \frac{g\pi}{(g+s)\Lambda_g} = 0 \quad (13b)$$

Figure 3A:
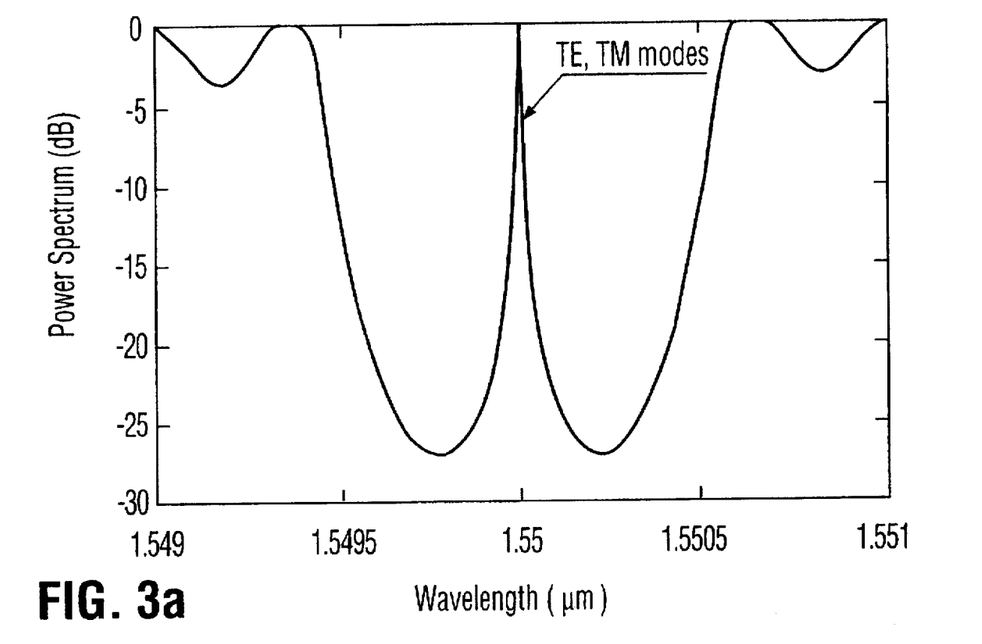
FIGS. 3a and 3b compare power spectra as a function of wavelength for an ideal filter response and a practical filter response showing the polarization dependence of the TE and TM modes, respectively.

Ideally, the filter provides a common stopband for the two polarizations, centered at the filter operation wavelength $\lambda_0$, as schematically shown in FIG. 3a.

Let $\lambda_{TE} = \lambda_{TM} = \lambda_0$ and utilizing the phase matching conditions given by equations (13a) and (13b), one derives $$g = \frac{1-B}{2B} \quad (14)$$

$$\Lambda_g = \frac{1+B}{1+(2s-1)}\frac{\lambda_0}{2N_{TE}} \quad (15)$$

where $$B = \frac{N_{TE} - N_{TM}}{N_{TE} + N_{TM}} \quad (16)$$

is the normalized modal birefringence. In the case that the grating coupling coefficients are different for the two polarizations, the parameter s may be adjusted according to $$\kappa_{TE}(g+1) = \kappa_{TM}(g) \quad (17)$$

For a given modal birefringence B one may define a phase shifted grating by using equations (14),(15),(16) and (17) to obtain a polarization independent Bragg reflector.

Figure 4:
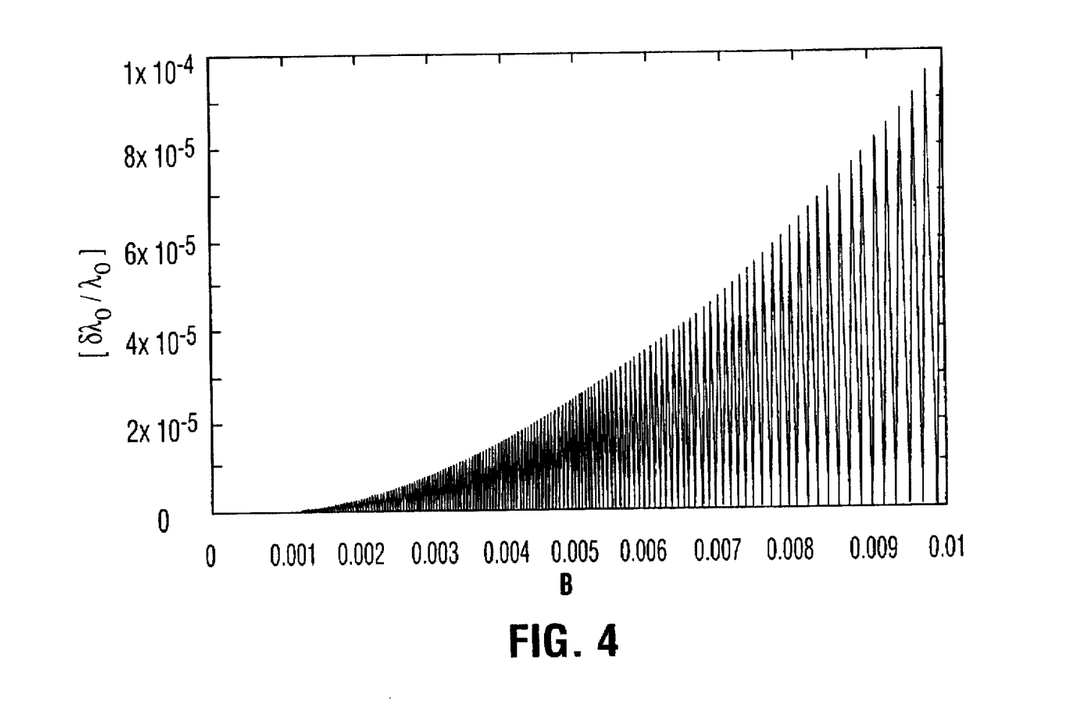

If the modal birefringence B can be controlled and adjusted in the waveguide design, then it is possible to produce an integer value for g in equation (14). Under this circumstance, a truly polarization independent Bragg reflector can be realized. Otherwise, one may define g as the nearest integer to $$\frac{1-B}{2B}$$

and equation (14) may be written as $$g + \delta g = \frac{1-B}{2B} \quad (18)$$

where $\delta g$ denotes the error which is exclusively determined by B and $|\delta g| \leq 0.5$. Therefore, there will be an off-set between the centres of the stopbands for the two polarizations. FIG. 4 shows the relative wavelength offset between the two polarizations as a function of B. As expected, the off-set vanishes whenever B corresponds to an integer value of $$\frac{1-B}{2B},$$

and its maximum decreases as the modal birefringence B decreases.

At the Bragg condition, the resonant conditions of equation (11) become $$\frac{2\pi}{\lambda_0} N_{TE} L_P = (2n_{TE} + 1)\frac{\pi}{2} \quad (19a)$$

$$\frac{2\pi}{\lambda_0} N_{TM} L_P = (2n_{TM} + 1)\frac{\pi}{2} \quad (19b)$$

By utilizing equations (16) and (18), one derives from equations (19)

$$n_{TM} = (n_{TE} - n_{TM})g + (n_{TE} - n_{TM})\delta g - 0.5 \quad (20)$$

If $\delta g$ is zero, then $n_{TM} = (n_{TE} - n_{TM})g - 0.5$ and therefore the total phase shifts for the TE and the TM modes are integer numbers of $\pi$, which is the anti-resonance condition. Therefore, from the theoretical point of view, it is impossible to realize a polarization independent resonator filter based on the phase shifted grating reflectors operating at the centre of the common stopband for the two polarizations.

Figure 3B:
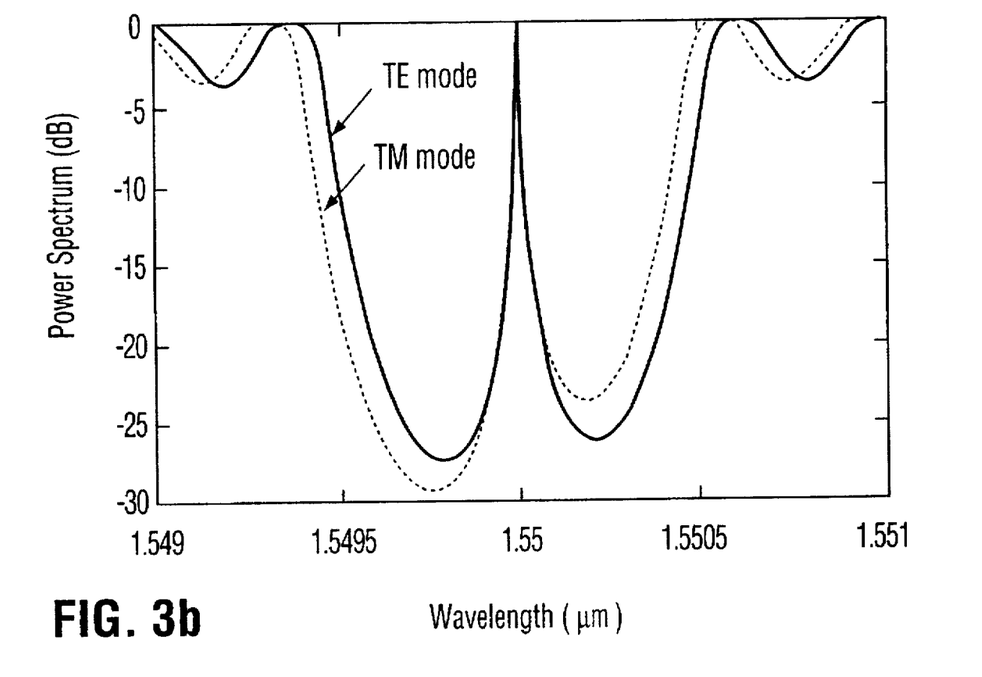
Figure 5A:
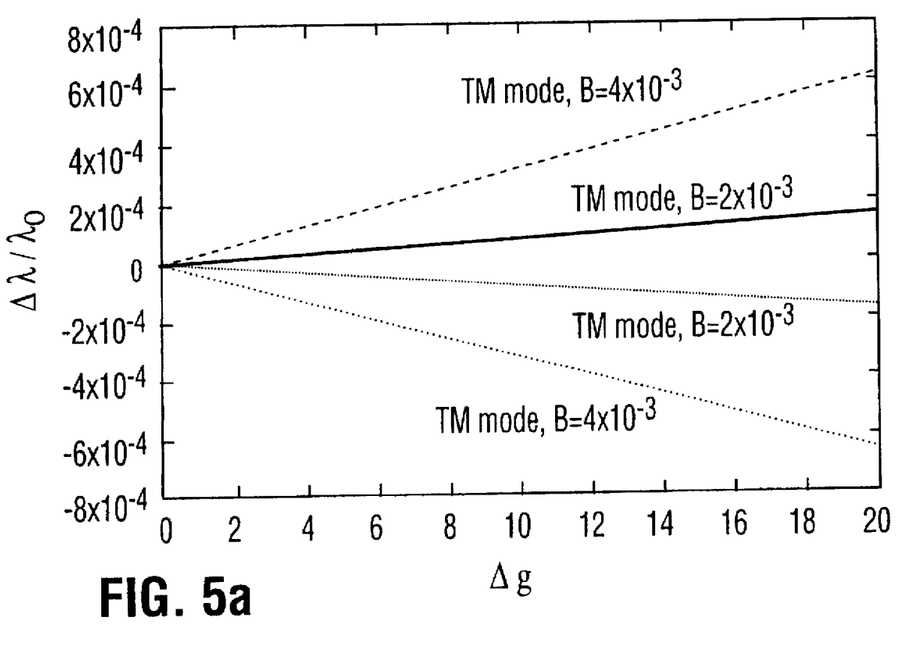
Figure 5B:
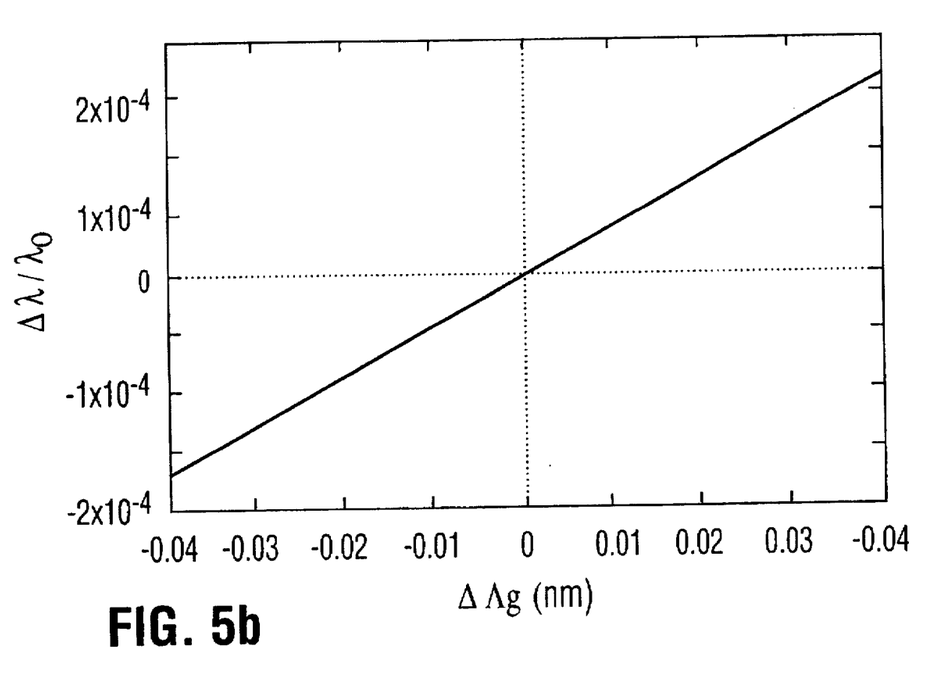

To overcome this difficulty, one solution is to achieve the resonance condition of equation (11) at a wavelength shifted from the centres of the stop bands of the two polarizations, as shown schematically in FIG. 3b. To do so one may vary grating parameters such as g and $\Lambda_g$. By assuming that the wavelength shifts are small, i.e. B<<1, s~0.5 and $$\frac{\lambda_0}{N_i} \frac{dN_i}{d\lambda}\bigg|_{\lambda_0} << 1 (i = TE, TM),$$

one can derive from the phase matching condition $$\frac{\Delta\lambda_{TE}}{\lambda_0} = -2B^2\Delta g + [1 + 2(s-1)B]\frac{2N_{TE}}{\lambda_0}\Delta\Lambda_g \quad (21a)$$

$$\frac{\Delta\lambda_{TM}}{\lambda_0} = 2B^2\Delta g + [1 + 2(s-1)B]\frac{2N_{TE}}{\lambda_0}\Delta\Lambda_g \quad (21b)$$

where we have used $\Delta g$ to stand for the change in g (i.e. the number of gratings for $\lambda_0$) and $\Lambda_g$. Therefore $\Delta g$ includes both the integral and the fractional components. It is instructive to note that $\Delta g$ causes the stopbands of the TE and TM modes to shift in opposite directions by the same magnitude, whereas the change of the grating period $\Lambda_g$ simply causes a common shift of the stopbands. FIGS. 5a and 5b shows the shifts of the central wavelengths as functions of $\Delta g$ and $\Delta\Lambda_g$ respectively. For the two polarizations the phase changes induced by $\Delta g$ and $\Delta\Lambda_g$ may be expressed as:

$$\Phi_{TE} = \quad (22a)$$

$$\frac{2\pi}{\lambda_0} N_{TM} \frac{\tanh(\kappa_{TE}L_z)}{\kappa_{TE}} \left\{ -2B^2\Delta g + [1 + 2(s-1)B]\frac{2N_{TE}}{\lambda_0}\Delta\Lambda_g \right\}$$

$$\Phi_{TM} = \quad (22a)$$

$$\frac{2\pi}{\lambda_0} N_{TM} \frac{\tanh(\kappa_{TM}L_z)}{\kappa_{TM}} \left\{ 2B^2\Delta g + [1 + 2(s-1)B]\frac{2N_{TM}}{\lambda_0}\Delta\Lambda_g \right\}$$

In deriving equations (22), equation (21) was used, and it was assumed that $\Phi_{TM}, \Phi_{TE} << 1$ and B<<1, and s~0.5. Therefore, for a given modal birefringence B the resonance conditions (11) may be satisfied by adjusting $\Delta g$ and $\Delta\Lambda_g$. For the sake of simplicity, we let $$n_{TE} = n_{TM} + 1 \quad (23)$$

and derive from equations (11), (22) and (23)

$$n_{TE} = \frac{1-B}{2B} + \Delta n_{TM} \quad (24)$$

where $$\Delta n_{TM} = \frac{4N_{TE}}{\lambda_0} \frac{\tanh(\kappa_{TM}L_z)}{\kappa_{TM}} B\Delta g - 0.5 \quad (25)$$

Figure 6:
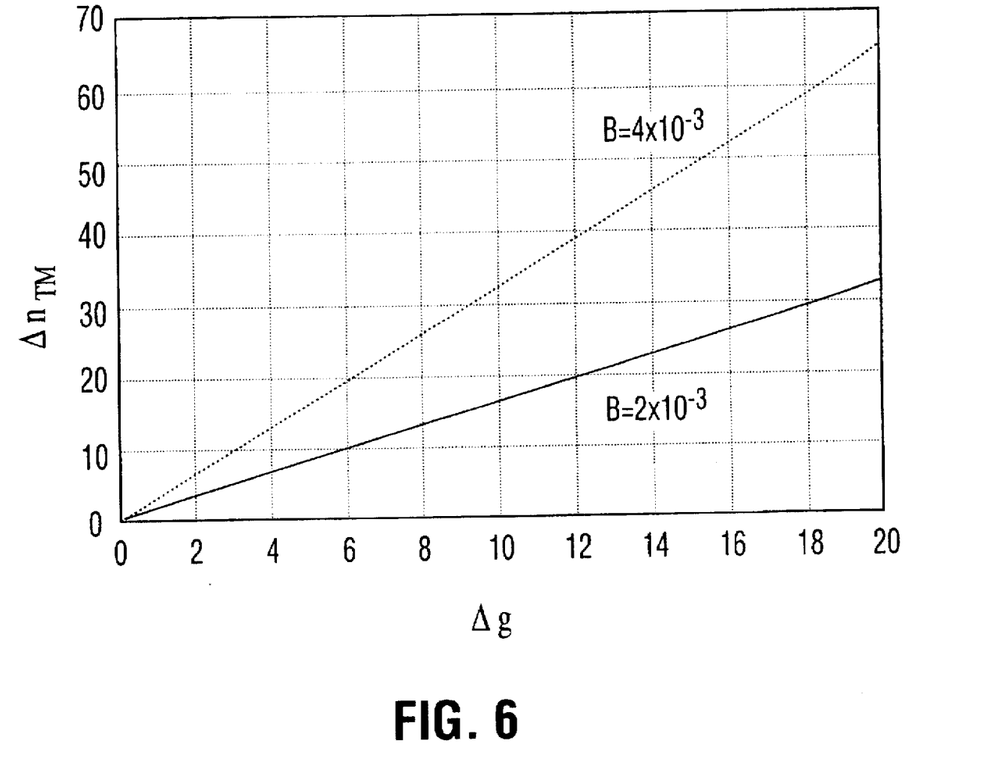
FIG. 6 shows the change of $\Delta n_{TM}$ as a function of $\Delta g$

For an optimum design, one may vary $\Delta g$ in order to make the right hand side of equation (25) close to an integer. As mentioned above, the fractional component in $\Delta g$ is already determined by B so that only the integral component acts as a free parameter. One may find several $\Delta g$ in the optimization procedure. However $|\Delta g|$ is directly proportional to the shifts of the stop bands from $\lambda_0$ for quasi TE and TM modes as shown in FIG. 5. It is desirable to choose smaller $|\Delta g|$ in order to achieve maximum tunable range. FIG. 6 show the variations of $\Delta n_{TM}$ as functions of $|\Delta g|$. Finally, the length of the phase shift between the reflectors is $$L_p = \left[ (2n_{TM} + 3)\frac{\pi}{2} - \Phi_{TE} \right] \frac{\lambda_0}{2\pi N_{TE}} \quad (26)$$

It should be noted that an increase in $\Delta\Lambda_g$ will induce an increase in $\Phi_{TE}$ and a decrease in $L_p$ if $n_{TM}$ is a given constant. Hence equation (25) may be independent of $\Delta\Lambda_g$. The total length of the resonator filter is $$L = 2L_z + L_p \quad (27)$$

where, $L_z = n_z(L_g + L_s)$ and $n_z$ represents the number of gratings in each grating section In summary, to design a polarization independent grating resonator, comprising phase shifted gratings, the purpose of the design is to find $L_g$, $L_s$, and $L_p$, as shown in FIG. 1. The following parameters must be known: $\lambda_0$ the wavelength, $N_{TE}$ the effective index of the TE mode and $N_{TM}$ the effective index of the TM mode. When those parameters are given, the cross-section of the device is given. That is the value of B may be calculated from equation (16)

$$B = \frac{N_{TE} - N_{TM}}{N_{TE} + N_{TM}}$$

and then g may be calculated from equation (14), i.e.

$$g = \frac{1-B}{2B}.$$

Then, using the relationship of equation (17), $\kappa_{TE}(g+1)=\kappa_{TM}(g)$, so that $$\Lambda_g = \frac{1+B}{1+(2s-1)2N_{TE}} \lambda_0$$

can be calculated (equation (15), the parameter s can be obtained. Given s, and g and $\Lambda_g$, then $L_s=s\Lambda_g$, $L_g=g\Lambda_g$ and $L_z=n_z(L_g+L_s)$, where $n_z$ is an integer number and can be chosen by the designer.

In an optimum design, $\Delta g$ is varied to make $\Delta n_{TM}$ of equation (25) close to an integer. $\Delta g$ and $\Delta\Lambda_g$ can be chosen from FIG. 5. $\Phi_{TE}$ can then be determined by Equation (22b), so that from equation 26, the length $L_p$ can be determined, i.e.

$$L_p = \left[ (2n_{TM}+3)\frac{\pi}{2} - \Phi_{TE} \right] \frac{\lambda_0}{2\pi N_{TE}}.$$

Thus, the total device length is $L=2L_z+L_p$.

What is claimed is:

1. A phase shifted grating structure for a grating resonator filter, comprising:
   first and second sections of phase shifted gratings each of the first and second sections comprising a plurality of fine grating sections of length $L_g$ with a grating period $\Lambda_g$ with intervening phase shift sections of length $L_s$; and a phase shift section of length $L_p$ disposed between the first and second sections of phase shifted gratings;
   the lengths of the phase shift sections and grating sections and the grating period being determined to match the propagation constants of the TE and TM modes at a specific wavelength $\lambda_0$ at the centre of the stop band of the filter, thereby providing a resonator filter which is polarization insensitive.

2. A phase shifted grating structure according to claim 1 wherein the phase matching conditions are determined by $$\frac{2\pi}{\lambda_0} N_{TE}L_P + \Phi_{TE} = (2n_{TE}+1)\frac{\pi}{2} \quad (11a)$$

$$\frac{2\pi}{\lambda_0} N_{TM}L_P + \Phi_{TM} = (2n_{TM}+1)\frac{\pi}{2} \quad (11b)$$

where $$\Phi_{TE} = \tan^{-1}\left\{ \frac{\delta_{TE}}{\left(\sqrt{|\kappa_{TE}(m)|^2 - \delta_{TE}^2(m)}\right)} \tanh\left(\sqrt{|\kappa_{TE}(m)|^2 - \delta_{TE}^2(m)}L_z\right) \right\} \quad (12a)$$

$$\Phi_{TM} = \tan^{-1}\left\{ \frac{\delta_{TM}}{\left(\sqrt{|\kappa_{TM}(m)|^2 - \delta_{TM}^2(m)}\right)} \tanh\left(\sqrt{|\kappa_{TM}(m)|^2 - \delta_{TM}^2(m)}L_z\right) \right\} \quad (12b)$$

$n_{TE}$ and $n_{TM}$ are integers.

3. A grating structure according to claim 1 wherein the grating shape is rectangular, and $\Lambda_g$ is the period of the fine gratings, and $L_g=g\Lambda_g$, $L_s=s\Lambda_g$ are the lengths of the grating and the phase shift sections respectively, for a given normalized modal birefringence B $$B = \frac{N_{TE}-N_{TM}}{N_{TE}+N_{TM}}$$

and taking $\lambda_{TE}=\lambda_{TM}=\lambda_0$, $$g = \frac{1-B}{2B} \text{ and } \Lambda_g = \frac{1+B}{1+(2s-1)} \frac{\lambda_0}{2N_{TE}}.$$

4. A grating structure according to claim 3 wherein the grating coupling coefficients are different for the two polarizations, the parameter s is adjusted according to $$\kappa_{TE}(g+1)=\kappa_{TM}(g).$$

5. A grating structure according to claim 3 wherein it is assumed that $\Phi_{TM},\Phi_{TE}<<1$ and $B<<1$, and $s\sim0.5$ and for a given modal birefringence B the resonance conditions are satisfied by adjusting $\Delta g$ and $\Delta\Lambda_g$, and assuming $$n_{TE} = n_{TM} + 1$$

$$n_{TM} = \frac{1-B}{2B} + \Delta n_{TM} \quad (24)$$

where $$\Delta n_{TM} = \frac{4N_{TE}}{\lambda_0} \frac{\tanh(\kappa_{TM}L_z)}{\kappa_{TM}} B\Delta g - 0.5. \quad (25)$$

6. A grating structure according to claim 5 wherein the length of the phase shift between the reflectors is given by $$L_P = \left[ (2n_{TM}+3)\frac{\pi}{2} - \Phi_{TE} \right] \frac{\lambda_0}{2\pi N_{TE}} \quad (26)$$

-continued where $$\Phi_{TE} \approx \frac{2\pi}{\lambda_0} N_{TM} \frac{\tanh(\kappa_{TE}L_z)}{\kappa_{TE}} \left\{ -2B^2\Delta g + [1 + 2(s-1)B]\frac{2N_{TE}}{\lambda_0} \Delta\Lambda_g \right\} \quad (22a)$$

$$\Phi_{TM} \approx \frac{2\pi}{\lambda_0} N_{TM} \frac{\tanh(\kappa_{TM}L_z)}{\kappa_{TM}} \left\{ -2B^2\Delta g + [1 + 2(s-1)B]\frac{2N_{TM}}{\lambda_0} \Delta\Lambda_g \right\} \quad (22b)$$

and the total length of the resonator filter is given by $L=2L_z+L_p$ where, $L_z=n_z(L_g+L_s)$ and $n_z$ represents the number of gratings in each grating section.

7. A polarization independent optical resonator filter comprising a phase-shifted grating structure as defined in claim 1.

* * * * *